United States Patent [19]

Malcolm et al.

[11] Patent Number: 4,798,426

[45] Date of Patent: Jan. 17, 1989

[54] HOLOGRAPHIC OPTICAL ELEMENT FOR INSTRUMENT PANEL DISPLAYS

[75] Inventors: Richard E. Malcolm, Oakville; Frank Neuperger, St. Catherines, both of Canada

[73] Assignee: Astronautics Corporation of America, Milwaukee, Wis.

[21] Appl. No.: 136,464

[22] Filed: Dec. 22, 1987

Related U.S. Application Data

[63] Continuation of Ser. No. 915,631, Oct. 6, 1986, abandoned.

[30] Foreign Application Priority Data

Oct. 7, 1985 [CA] Canada ................................. 492407

[51] Int. Cl.$^4$ ........................... G02B 5/32; G03H 1/22
[52] U.S. Cl. ................................. 350/3.7; 350/3.81; 350/3.86
[58] Field of Search ....................... 350/3.7, 174, 3.81, 350/3.86

[56] References Cited

U.S. PATENT DOCUMENTS

| | | | |
|---|---|---|---|
| 2,887,927 | 5/1959 | Newton | 88/1 |
| 3,824,535 | 7/1974 | Rover, Jr. | 340/27 NA |
| 3,940,204 | 2/1976 | Withrington | 350/3.5 |
| 4,083,239 | 4/1978 | Malcolm et al. | 73/178 R |
| 4,218,111 | 8/1980 | Withrington et al. | 350/3.72 |
| 4,261,635 | 4/1981 | Freeman | 350/3.72 |
| 4,309,070 | 1/1982 | St. Leger Searle | 350/3.7 |
| 4,397,555 | 8/1983 | Malcolm et al. | 356/248 |
| 4,530,564 | 7/1985 | Close | 350/3.69 |
| 4,600,271 | 7/1986 | Boyer et al. | 350/172 |
| 4,613,200 | 9/1986 | Hartman | 350/3.72 |

*Primary Examiner*—Bruce Y. Arnold
*Attorney, Agent, or Firm*—Lathrop & Clark

[57] ABSTRACT

A holographic optical element is applied over existing aircraft panel and instruments thereon so as to display an image which is reflected from a source located off the panel. The image is reflected only to an area at which the viewer may observe the image and is not directed to other areas so as to prevent unwanted reflections and glare within the aircraft cockpit.

17 Claims, 2 Drawing Sheets

HOLOGRAPHIC OPTICAL ELEMENT FOR INSTRUMENT PANEL DISPLAYS

This application is a continuation, of application Ser. No. 915,631, filed Oct. 6, 1986 abandoned.

BACKGROUND OF THE INVENTION

This invention relates to a display system. In a situation such as in an aircraft, where space is limited, there is a restriction on the number of instruments and displays that will fit in a given amount of panel space. For example, it would be desirable to locate an artificial horizon display near other navigational and control displays in fighter aircraft at the top of the instrument panel. However, in most modern fighters, the artificial horizon is placed near the bottom of the instrument panel, and the pilot, with his oxygen mask on, must alter his direction of gaze by more than 30° to check the instrument. To increase the amount of information displayed on the instrument panel without increasing the number of instruments, it may be desirable to selectively project an image such as an image of an artificial horizon onto a portion of the instrument panel which is occupied by existing switches, controls, and other non-display components. However, such light projection is undesirable since it introduces light into the cockpit area which can result in unwanted reflections and glare, including reflections off of the cockpit canopy, a particularly significant problem during night-time flying.

SUMMARY OF THE INVENTION

In the present invention, additional information display is obtained by superimposing information over the existing instruments by reflecting additional symbolic information from a source such as a cathode ray tube (CRT) into the pilot's eyes. The pilot sees the additional information as being overlayed on the existing instruments, controls and panel.

The reflected symbols are designed to be sufficiently distinct from those already in use on the panel that they would not be confused with each other. In addition, the medium of the display is located in such a way as not to interfere with the normal operation of the instruments or controls over which it is superimposed.

The display screen has the form of a medium which can be applied over existing controls or instruments on an instrument panel, and cut out, if necessary, so as to permit knobs or touch keys to protrude through the screen. The superior surfaces of the knobs or keys can be covered in the same medium, so as to substantially fill the area over which it has been applied. The medium is optically clear, so as not to interfere with the viewing of the controls or instruments over which it has been applied. The medium behaves as a reflector of high efficiency for a specific, narrow bandwidth of light and may be optically clear to all other visible light.

The diffuse reflecting properties of the medium are optimized such that an observer at a specific distance from the medium is able to see the superimposed display image only if his eyes are within a predetermined area. This property of the display prevents its luminence from being directly radiated into areas where it is not desired. The medium is referred to herein as the projection screen.

Further objects, features, and advantages of the invention will be apparent from the following detailed description when taken in conjunction with the accompanying drawings.

DESCRIPTION OF THE PREFERRED EMBODIMENT

Figure 1A:
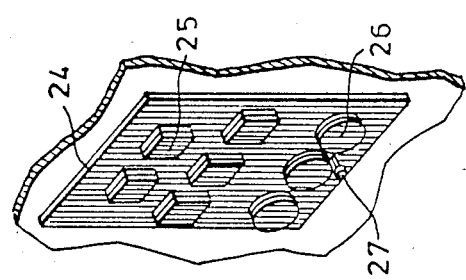
FIG. 1A is a perspective view of a projection screen in accordance with the invention mounted over a section of an instrument panel.
Figure 1:
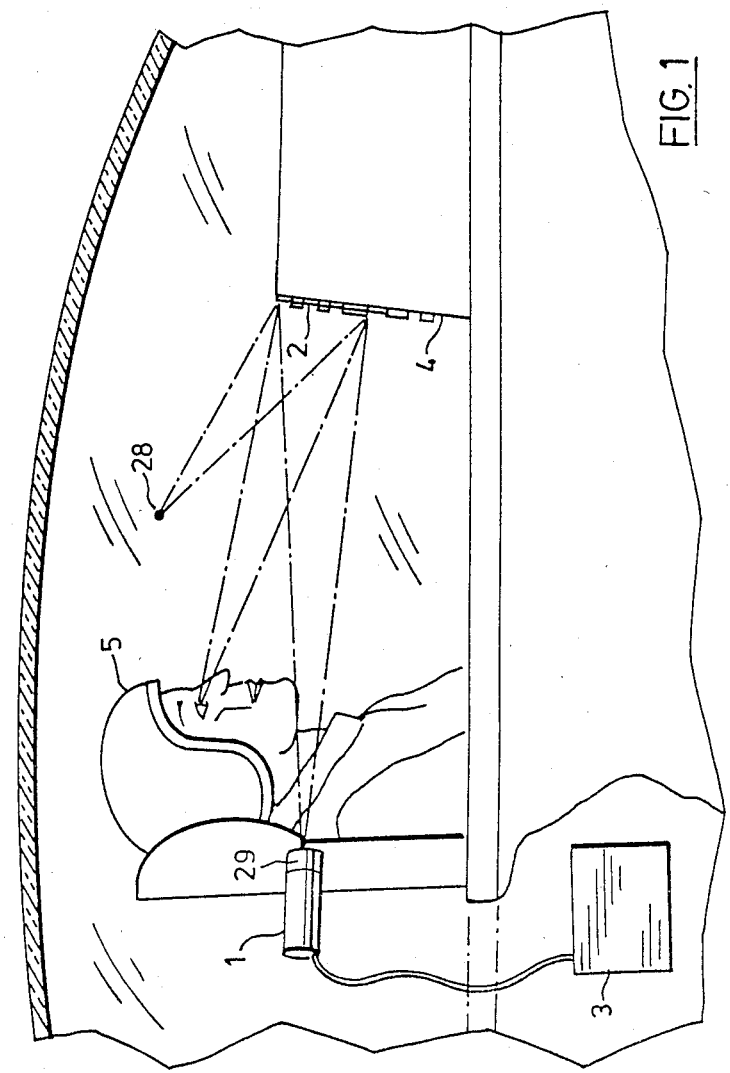
FIG. 1 is an exemplary layout of the display system of the invention.

The typical layout of the display system is shown in FIG. 1. The display system consists of a projector 1, projection screen 2, and the necessary electronics 3 to support the projector 1. The projection screen 2 is mounted in a position which is overlaying a section of the instrument panel 4, and which is shown magnified in FIG. 1A. It can be seen that the projection screen 2 is not perpendicular to the projector 1 nor to the observer 5.

The projector 1 consists of a 1–1.5 inch diameter cathode ray tube (CRT) with a phosphor coating of narrow spectral emission such as P-43, and a relay lens assembly 29. The relay lens assembly consists of optical elements which are tilted and decentered to accommodate for the abberations that arise from the fact that the projector is not perpendicular to the projection screen. The aperture of the relay lens assembly is preferably two inches in diameter, and the focal length is preferably such as to yield a 5X magnification of the CRT image when focused on the projection screen.

The projection screen is implemented as a holographic optical element sandwiched between two layers of fine Lexan or plexiglass, or, conversely, embossed on a suitable plastic such as Mylar, or made from a holographic material such as Polaroid DMP 128 (T.M. Reg'd), all of which are techniques well known in the art. The media for making the master holographs may be dichromated gelatin, while the technique for making the holographic optical element (HOE) is the well known two-step process for generating image-plane holograms. The source of light for generating the holograms is a green laser with its spectral output in the vicinity of the spectral emission of P-43 phosphor. Any small difference in matching the wavelengths can be compensated for by adjusting the geometry of the exposures, a technique which is well known in the art.

FIG. 1A shows more clearly how the resulting HOE, which makes up the projection screen, is superimposed over the existing features of the instrument panel, such as gauges 26, switches 25, and the panel itself 24. Since the switches 25 extend outwardly from the panel, the HOE is cut or punched out to permit said extension through the HOE, and the cut out portions can be affixed to the surface of said switches, so as to provide a more or less continuous surface when seen from the optimal viewing area. Knobs, or other such narrow features 27 would simply protrude through the HOE and would not be covered with a holographic "cap".

Figure 2:
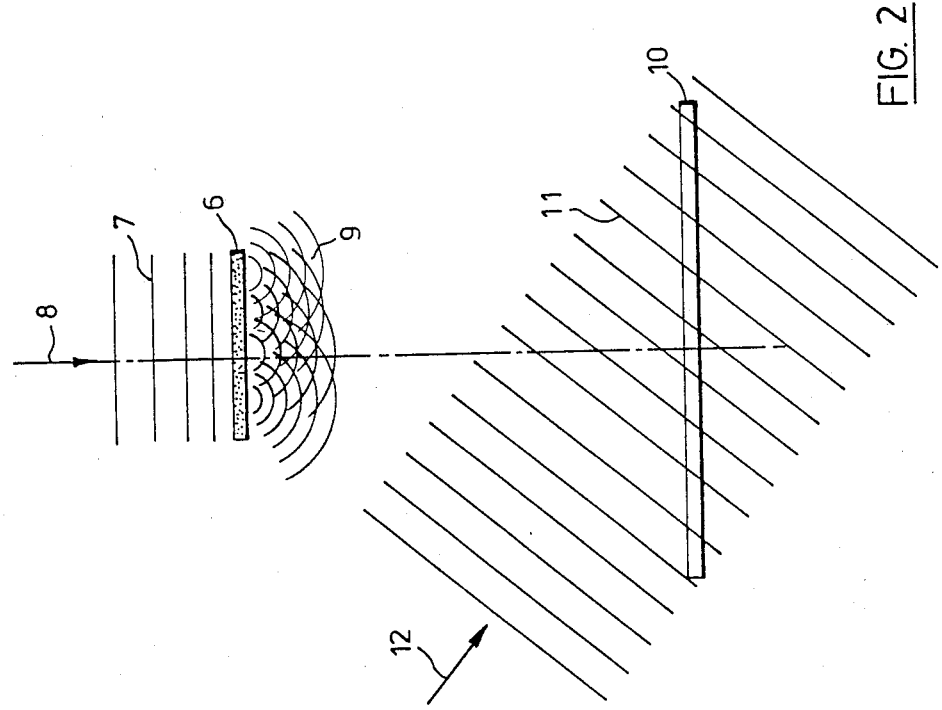
FIG. 2 illustrates the geometry required to construct the transmission master hologram.

FIG. 2 illustrates the geometry required to construct the transmission master hologram. The object to be holographed is an optical diffuser plate 6 which is backlit with a wave front 7 propagating in a direction indicated by the arrow 8. This will cause the diffuse light 9 to fall primarily on the film plate 10, which is dichromated gelatin or other such photographic material as is usual for holography. The plate 10 is also illuminated by a reference wavefront 11 propagating in the direction indicated by the arrow 12. After suitable exposure, the plate 10 is appropriately processed to yield the transmission hologram.

Figure 3:
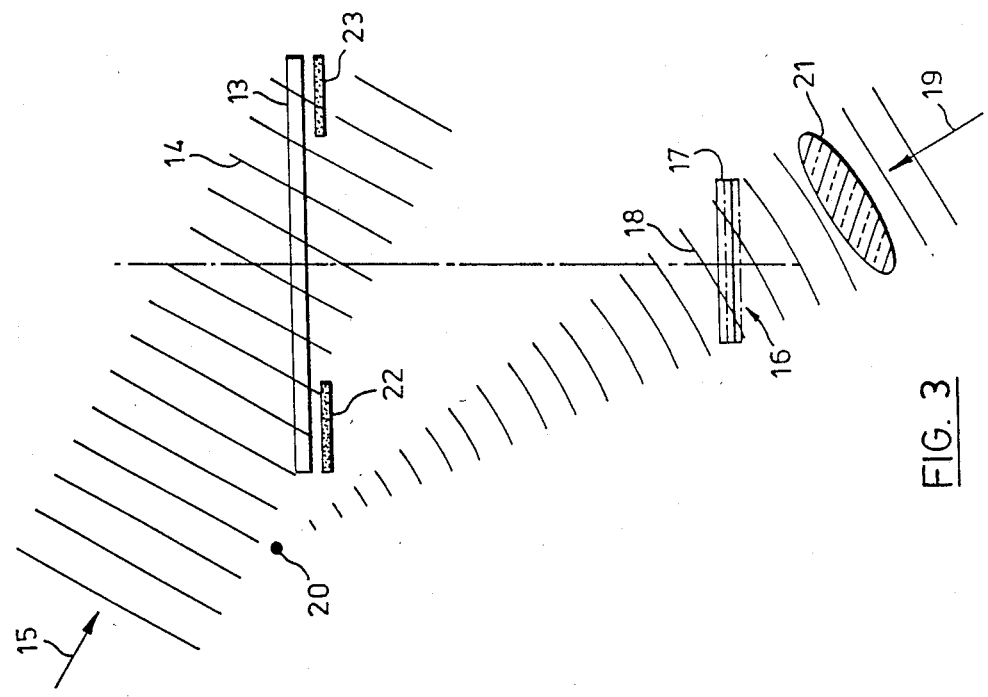
FIG. 3 illustrates the geometry required to construct the reflection copy hologram which comprises the projection screen.

FIG. 3 illustrates the geometry required to construct the reflection copy hologram which will comprise the projection screen. The transmission master hologram 13 is illuminated with wavefront 14 which is the conjugate of wavefront 11. Wavefront 14 is propagating in the direction indicated by the arrow 15. This conjugate illumination accomplishes the projection of a real image of the diffuser 16. Film plate 17 is placed adjacent to the real image of the diffuser 16 and is illuminated by a reference wavefront 18 which propagates in the direction of arrow 19. The reference wavefront 18 is converged to the point 20 by a lens 21. Point 20 relative to the film plate 17 represents the relative location of the projector 1 with respect to the projection screen 2 in FIG. 1.

The transmission master hologram is masked by opague material 22, 23 in a way such that the unmasked area corresponds to the observer's optimal viewing area. After suitable exposure and subsequent processing, the film plate 17 becomes a reflection copy hologram which comprises the projection screen of the display system. In commercial production, the plate 17 may be produced by photographic, printing or embossing techniques which are well-known in the art.

When the reflection copy hologram is used as the projection screen 2, in the geometry illustrated in FIG. 1, it will have the following properties: An image comprised of symbols generated on the face of the CRT will be projected onto the projection screen; an observer placing his eyes in the viewing area will see the image, magnified 5X, coplanar or not with the projection screen; the optimal viewing area will be uniformly illuminated with the light reflecting from the projection screen, by virtue of the diffusing element; no light will be reflected into areas other than the optimum viewing area; and the projection screen will reflect only the light from the CRT, and will appear otherwise transparent, so that symbols and features beneath the projection screen will be clearly visible through the projection screen.

It is understood that the invention is not limited to the particular embodiments set forth herein, but embraces such modified forms thereof as come within the scope of the following claims.

What is claimed is:

1. A holographic optical system comprising:
   a hologram superimposed with and positioned on or adjacent an existing instrument of an instrument panel and reflecting an image generated at a place other than said panel; and
   means for producing an image at a position away from the instrument panel and for projecting the image onto the hologram.

2. The holographic optical system of claim 1 wherein the means for producing and projecting the image includes a cathode ray tube located remote from the instrument panel and facing generally towards said panel.

3. The holographic optical system of claim 1 wherein the hologram is formed directly onto a sheet of clear material such as plastic.

4. The holographic optical system of claim 1 wherein the hologram is formed of a number of smaller holograms, each one directed so as to reflect said image toward the viewer's eyes.

5. The holographic optical system of claim 1 wherein the hologram causes the image reflected therefrom to be focused at some place other than the instrument panel.

6. The holographic optical system of claim 1 wherein the hologram is formed such that the viewing window of the image reflected from the hologram is controlled so as to prevent light from the hologram from shining towards regions other than a region to be occupied by the viewer's head.

7. The holographic optical system of claim 1 wherein the hologram has holes cut into it through which project mechanical features of the instrument panel such as knobs, keys and switches.

8. The holographic optical system of claim 7 wherein portions of the features which protrude through the hologram are themselves covered with holograms having substantially the same function as the background hologram.

9. The holographic optical system of claim 1 wherein the hologram contains a diffusing structure.

10. The holographic optical system of claim 9 wherein the means for producing and projecting the image contains a relay lens.

11. A holographic optical element comprising:
    a hologram superimposed with and positioned on or adjacent an existing instrument of an instrument panel and reflecting an image generated at a place other than said panel, the hologram being formed such that the viewing window of the image reflected from the hologram is controlled so as to prevent light from the hologram from shining towards regions other than a region to be occupied by the viewer's head.

12. The holographic optical element of claim 11 wherein the hologram is formed directly onto a sheet of clear material such as plastic.

13. The holographic optical element of claim 11 wherein the hologram is formed of a number of smaller holograms each one directed so as to reflect said image toward the viewer's eyes.

14. The holographic optical element of claim 11 wherein the hologram causes the image reflected therefrom to be focused at some place other than the instrument panel.

15. The holographic optical element of claim 11 wherein the hologram has holes cut into it through which project mechanical features of the instrument panel such as knobs, keys and switches.

16. The holographic optical element of claim 15 wherein portions of the features which protrude through the hologram are themselves covered with holograms having substantially the same function as the background hologram.

17. The holographic optical element of claim 11 wherein the hologram contains a diffusing structure.

* * * * *